United States Patent [19]
Sullivan et al.

[11] Patent Number: 5,631,722
[45] Date of Patent: May 20, 1997

[54] APPARATUS FOR EXPOSING AN ADJUSTABLE AREA OF A FILM

[75] Inventors: Edward V. Sullivan, Huntington Station; Don DiMarzio, Northport, both of N.Y.

[73] Assignee: Grumman Aerospace Corporation, Los Angeles, Calif.

[21] Appl. No.: 365,090

[22] Filed: Dec. 28, 1994

[51] Int. Cl.$^6$ .......................... G03B 27/28; G03B 42/04
[52] U.S. Cl. .............................................. 355/74; 378/167
[58] Field of Search ................... 355/74, 126; 378/167, 378/175, 181, 182, 185, 187

[56] References Cited

U.S. PATENT DOCUMENTS

| | | | |
|---|---|---|---|
| 3,983,400 | 9/1976 | Donovan | 378/181 |
| 4,150,895 | 4/1979 | Northrup | 355/74 |
| 4,476,569 | 10/1984 | Ogo | 378/175 |

FOREIGN PATENT DOCUMENTS 61-107342  5/1986  Japan ....................... 355/74

*Primary Examiner*—Joan H. Pendegrass
*Attorney, Agent, or Firm*—Terry J. Anderson; Karl J. Hoch, Jr.

[57] ABSTRACT

Apparatus for exposing a selected area of a film, and comprising a holding assembly for holding a film, and a first support assembly connected to and supporting the holding assembly. The apparatus further comprises an exposure area control assembly located adjacent the holding assembly and forming an adjustable opening to expose a selected area of the film, and a second support assembly connected to and supporting the exposure area control assembly. Preferably, the first support assembly supports the film assembly for movement upward and downward and forward and rearward, and for pivotal movement about horizontal and vertical axes. Also, the second support assembly supports the exposure area control assembly for forward and rearward movement, and for pivotal movement about horizontal and vertical axes. In addition, in a preferred embodiment, the exposure area control assembly includes a frame and a multitude of slats supported by the frame, and these slats may be moved to vary the size, shape, and position of the adjustable opening formed by that control assembly.

A preferred embodiment of the invention described herein in detail is very well suited for seamless topographic imaging large single crystal wafers, and in particular, for controlling the area of an x-ray film that is exposed when x-rays are scanned across a single crystal wafer to produce an x-ray topograph of the wafer.

21 Claims, 12 Drawing Sheets

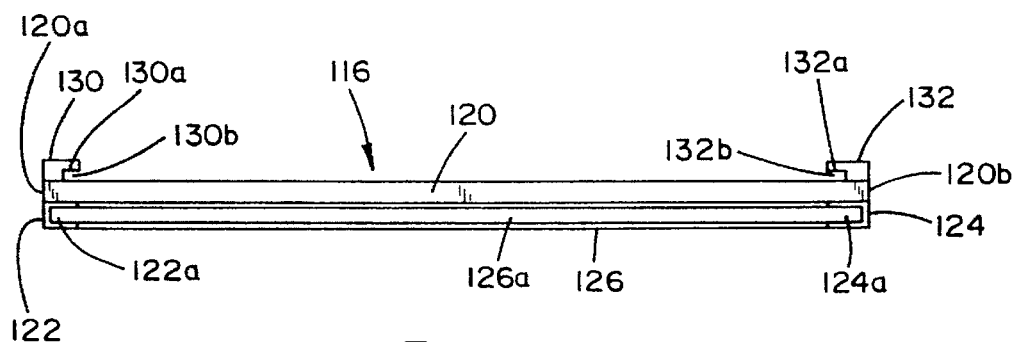
FIG.5
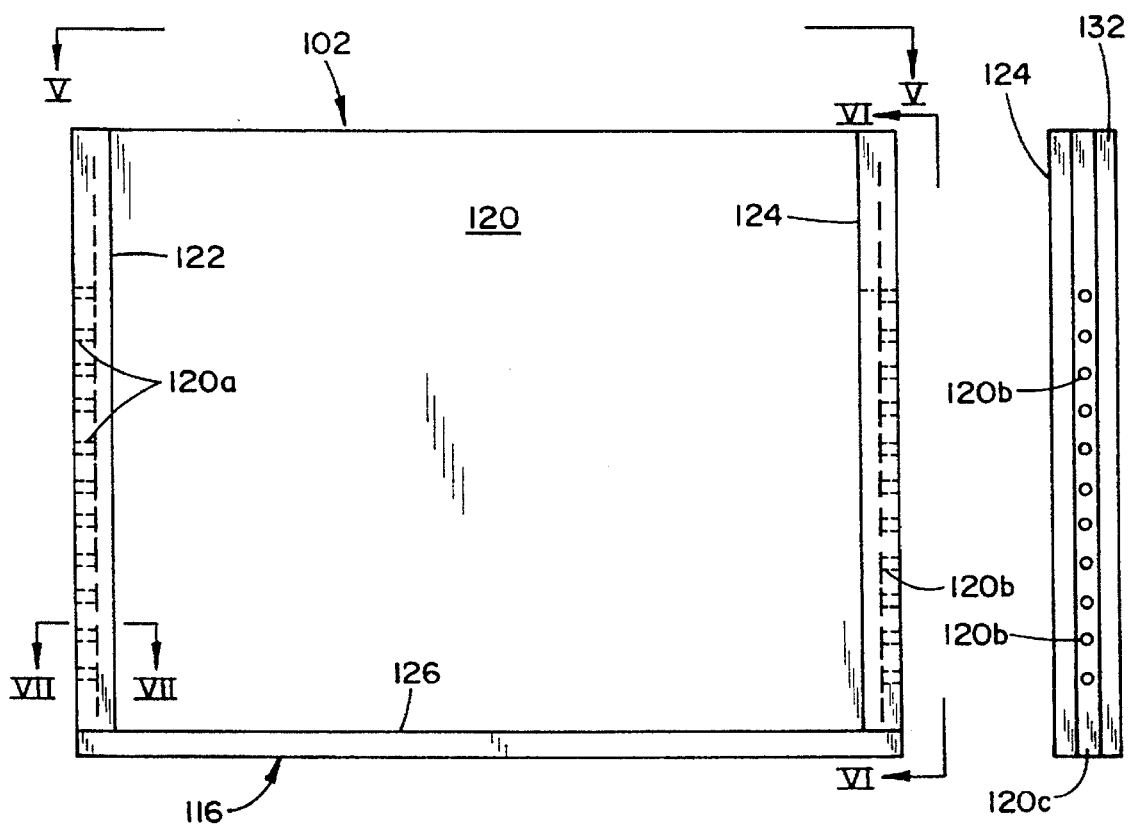
FIG.4
FIG.6

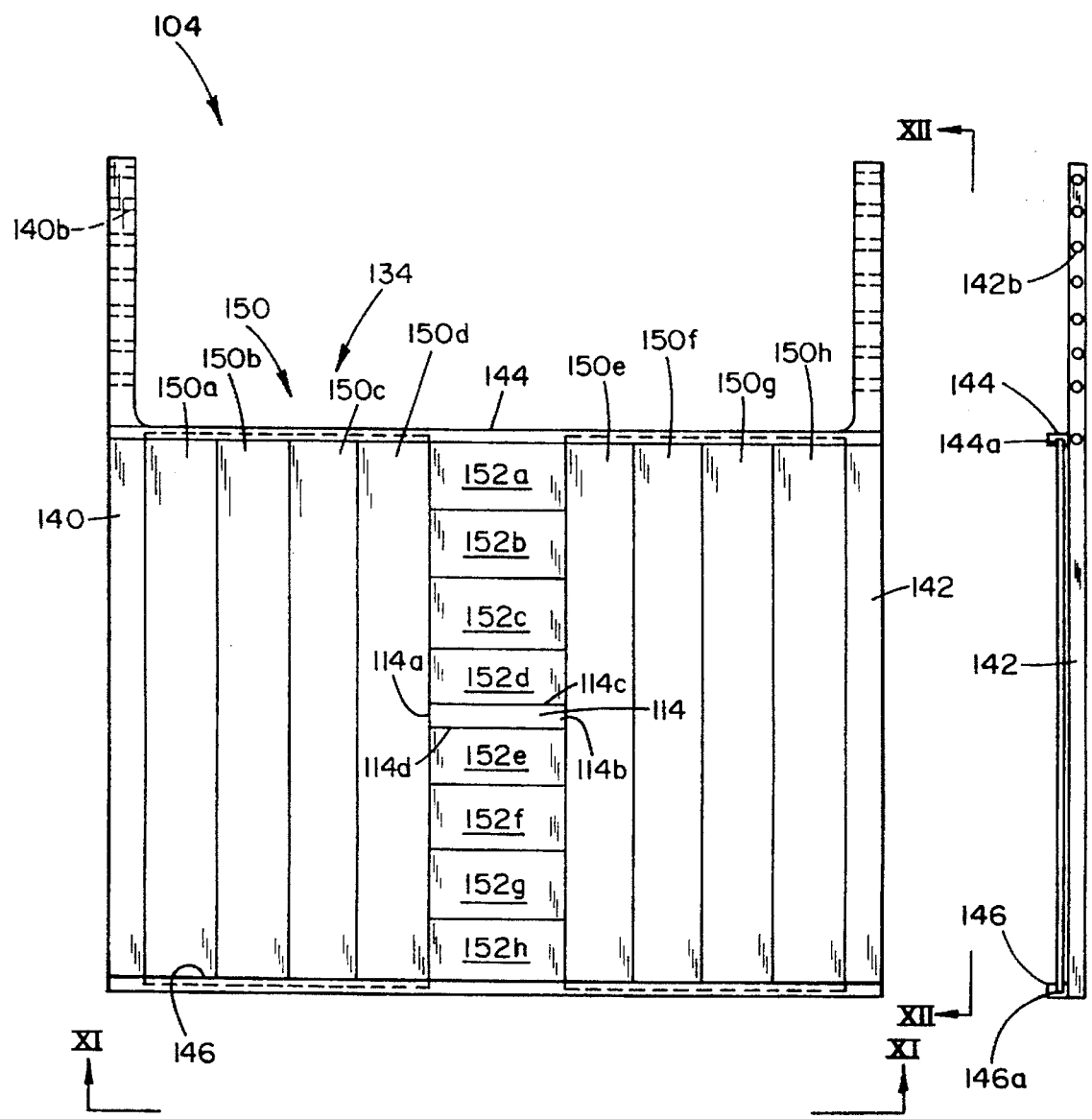
FIG. 10
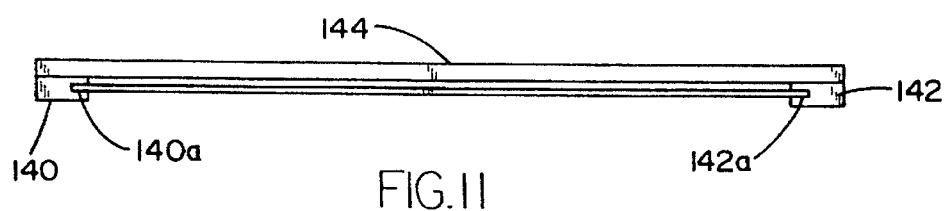
FIG. 11
FIG. 12

APPARATUS FOR EXPOSING AN ADJUSTABLE AREA OF A FILM

BACKGROUND OF THE INVENTION

This invention generally relates to apparatus for controlling the exposure area of a film; and more specifically, to an apparatus that is particularly well suited for controlling the area of an x-ray film that is exposed when x-rays are used to produce a topograph of crystal wafers. A preferred embodiment of the invention disclosed herein in detail relates to apparatus for seamless topographic imaging large single crystal wafers, and in particular, for controlling the area of an x-ray film that is exposed when x-rays are scanned across a single crystal wafer to produce an x-ray topograph of the wafer.

Single crystal wafers, which are commonly used to make semiconductors, are normally inspected after being formed. These wafers may be inspected by using x-rays to produce images of the top surfaces of the wafers, and to do this, x-rays are reflected off that top surface and onto x-ray film. With one specific procedure, an x-ray beam is reflected off an area of the top surface of the wafer and onto an area of the x-ray film. This process is repeated across the top surface of the wafer, to generate an image of the entire top surface of the wafer.

With this prior art procedure, it is often difficult to produce clear, sharp images on the x-ray film. In the former procedure, the x-rays are diffracted from the surface area of the wafer at various angles depending on the wavelength of the x-rays. Multiple images generated on the x-ray film may overlap, obscuring the information contained on these images. In addition, if the x-rays initially illuminate a large area of the wafer, x-ray fluorescence will cause the x-ray film to fog and degrade the topographic images.

SUMMARY OF THE INVENTION

An object of this invention is to produce clear, sharp images of the top surfaces of crystal wafers.

Another object of the present invention is to prevent stray, diffracted x-rays from blurring the image of a crystal wafer formed on an x-ray film.

A further object of this invention is to expose only a small area of an x-ray film at any given time during the formation of an x-ray picture of a crystal wafer.

Still another object of the present invention is to provide an apparatus for exposing a limited area of a film, and that may be operated to adjust both the size and location of that exposed area on the film.

These and other objectives are attained with an apparatus for exposing a selected area of a film. This apparatus comprises a holding assembly for holding a film, and a first support assembly connected to and supporting the holding assembly. The apparatus further comprises an exposure area control assembly located adjacent the holding assembly and forming an adjustable opening to expose a selected area of the film, and a second support assembly connected to and supporting the exposure area control assembly.

Preferably, the first support assembly supports the film assembly for movement upward and downward and forward and rearward, and for pivotal movement about horizontal and vertical axes. Also, the second support assembly supports the exposure area control assembly for forward and rearward movement, and for pivotal movement about horizontal and vertical axes. In addition, in a preferred embodiment, the exposure area control assembly includes a frame and a multitude of slats supported by the frame, and these slats may be moved to vary the size, shape, and position of the adjustable opening formed by that control assembly.

A preferred embodiment of the invention described herein in detail is very well suited for seamless topographic imaging large single crystal wafers, and in particular, for controlling the area of an x-ray film that is exposed when x-rays are scanned across a single crystal wafer to produce an x-ray topograph of the wafer.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 4 is a front view of a film holding assembly of the apparatus of FIG. 1.

FIG. 5 is a top view of the assembly of FIG. 4, taken along line V—V thereof.

FIG. 6 is a side view of the assembly of FIG. 4, taken along line VI—VI thereof.

FIG. 10 is a front view of the exposure control assembly.

FIG. 11 is a bottom view of the exposure control assembly of FIG. 10, taken along line XI—XI thereof.

FIG. 12 is a side view of the exposure control assembly and taken along line XII—XII of FIG. 10.

DETAILED DESCRIPTION OF THE PREFERRED EMBODIMENTS

Figure 1:
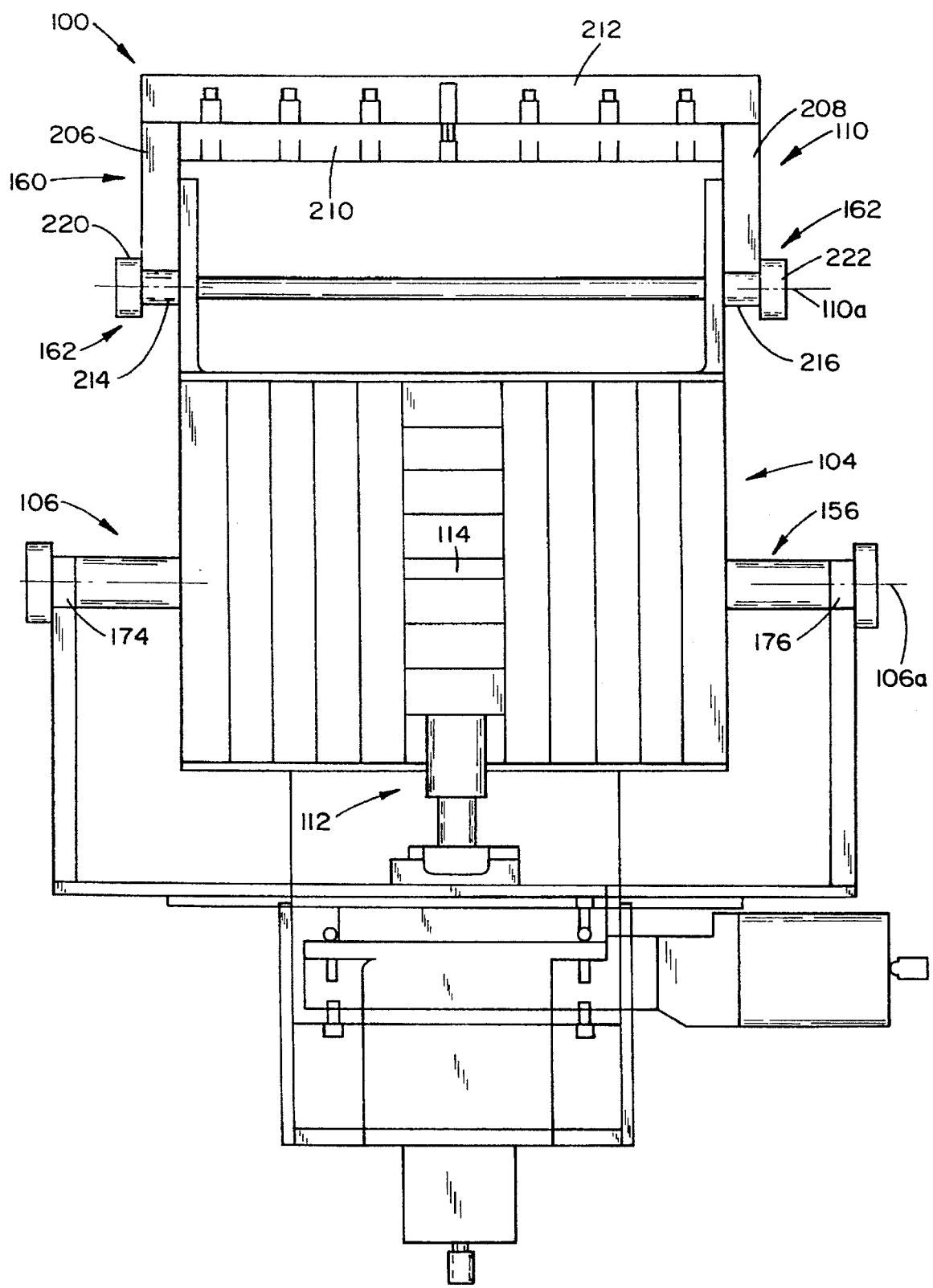
FIG. 1 is a front view of an apparatus embodying the present invention.
Figure 2:
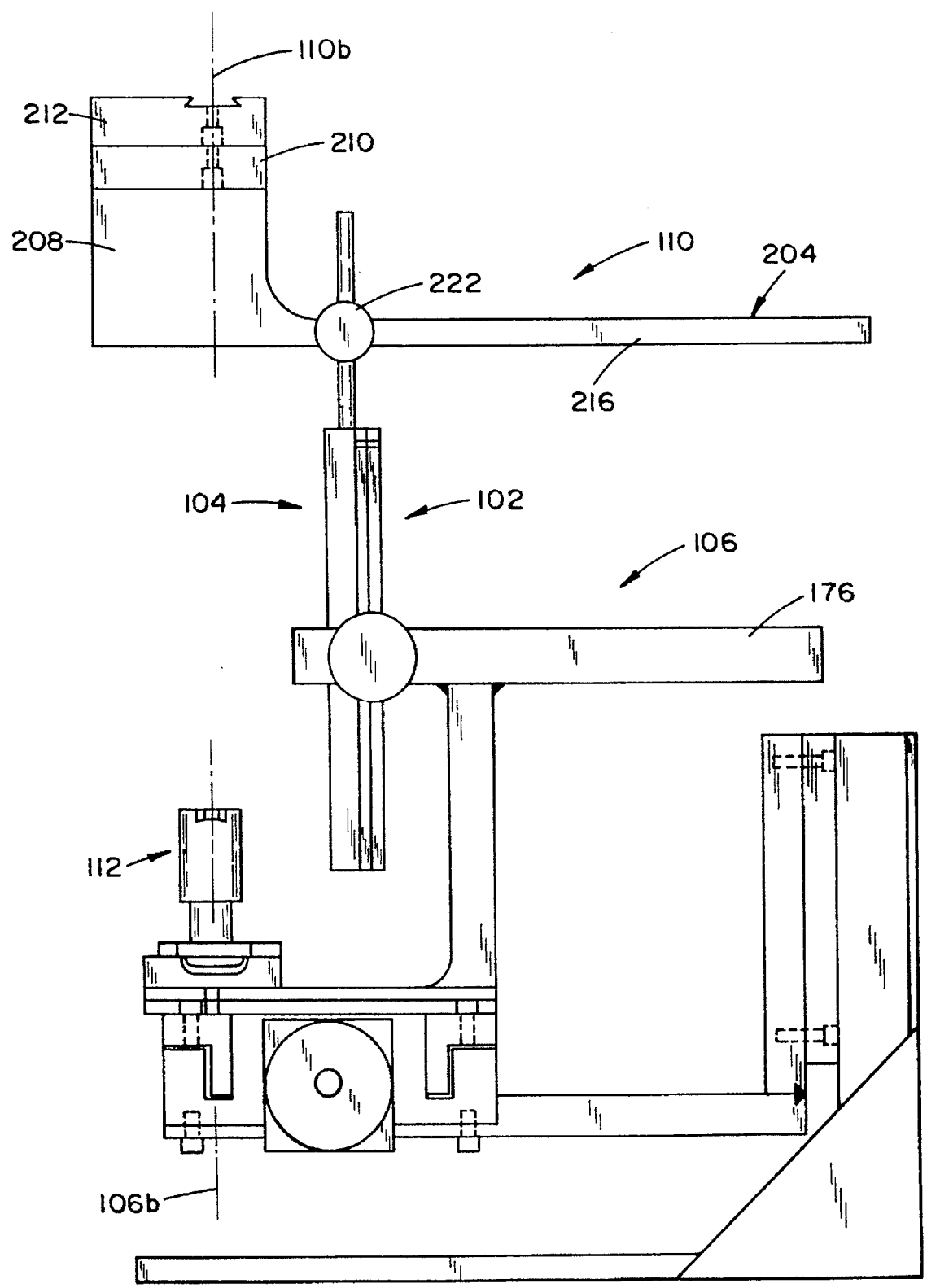
FIG. 2 is a side view of the apparatus of FIG. 1.
Figure 18:
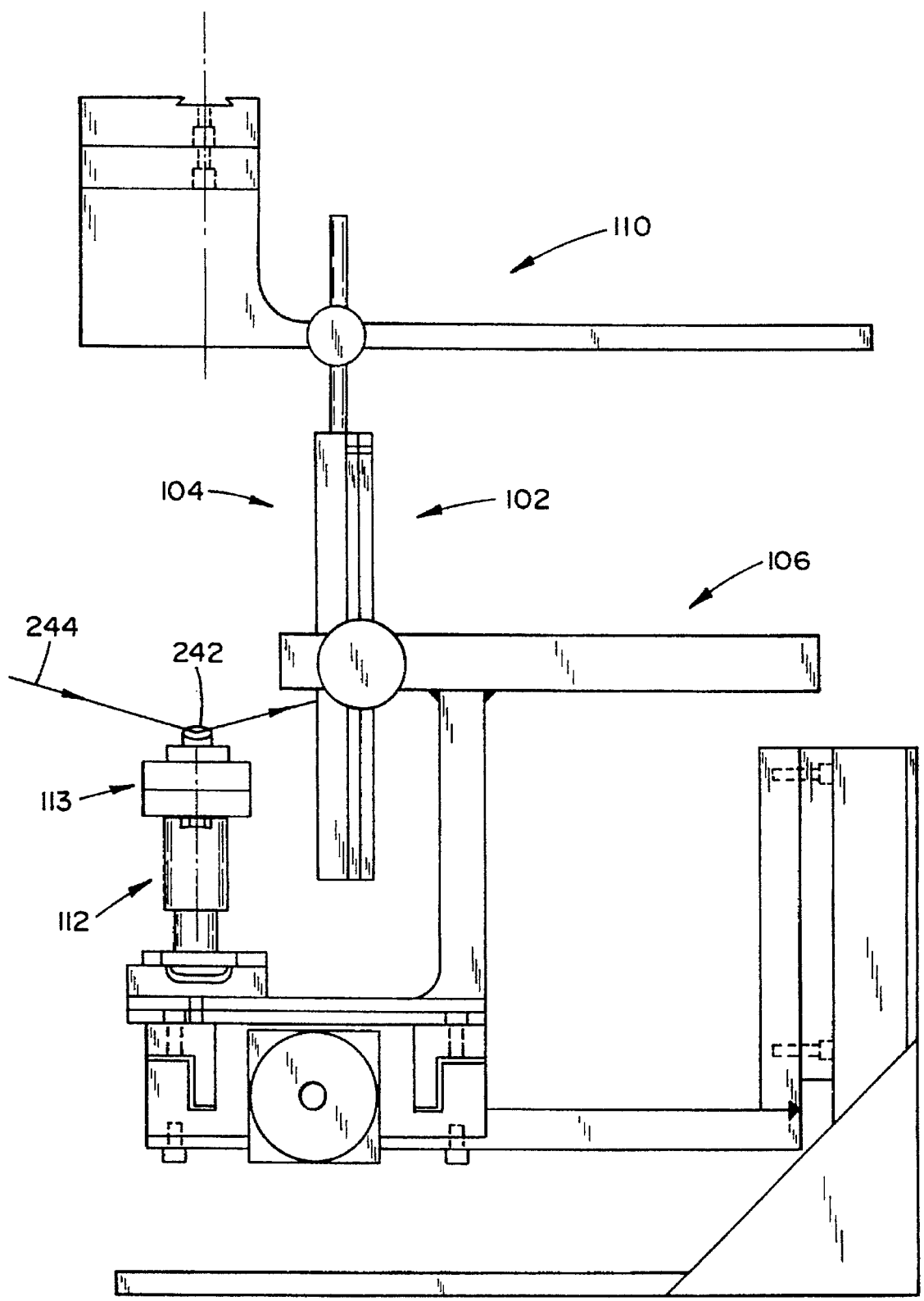
FIG. 18 shows the apparatus of FIGS. 1 and 2 in operation.

FIGS. 1 and 2 illustrate apparatus 100 generally comprising film assembly 102, exposure area control assembly 104, and first and second support assemblies 106 and 110, and preferably the apparatus also includes rotating pedestal 112 and goniometer 113 (shown in FIG. 18). Generally, assembly 102 is provided for holding film, assembly 104 is located adjacent assembly 102 and is provided to form an adjustable opening 114 to expose a selected area of the film held by assembly 102. Assemblies 106 and 110 are provided to support assemblies 102 and 104, respectively. Rotating pedestal 112, which supports a conventional goniometer 113, is provided to hold an object or article, such as a crystal wafer, at a particular height while that article is being photographed or x-rayed.

With particular reference to FIGS. 1–6, the preferred embodiment of film assembly 102 includes frame 116 that, in turn, includes plate 120, a set of channel members 122, 124, and 126 and a set of brackets 130 and 132. With reference to FIGS. 1, 2, and 9–13, the preferred embodiment of assembly 104 includes frame 134 and a multitude of slats generally referenced at 136; and more specifically, frame 134 includes first and second vertical members 140 and 142, and upper and lower members 144 and 146, and the multitude of slats includes first and second sets of slats generally referenced at 150 and 152, respectively.

Figure 8:
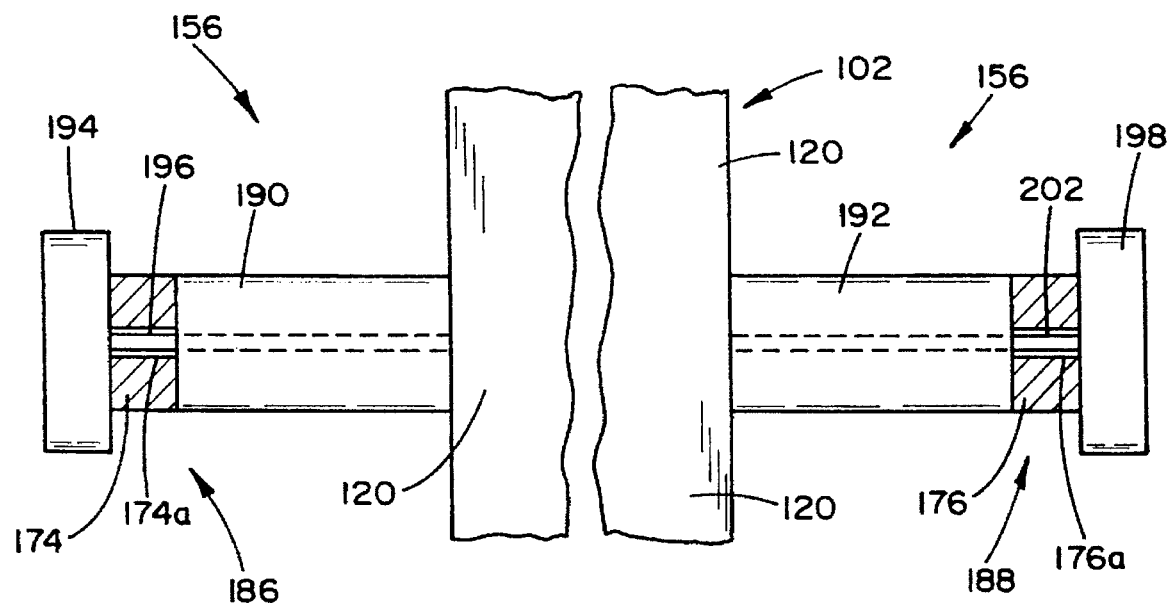
FIG. 8 shows a first coupling means of the apparatus of FIG. 1.
Figure 9:
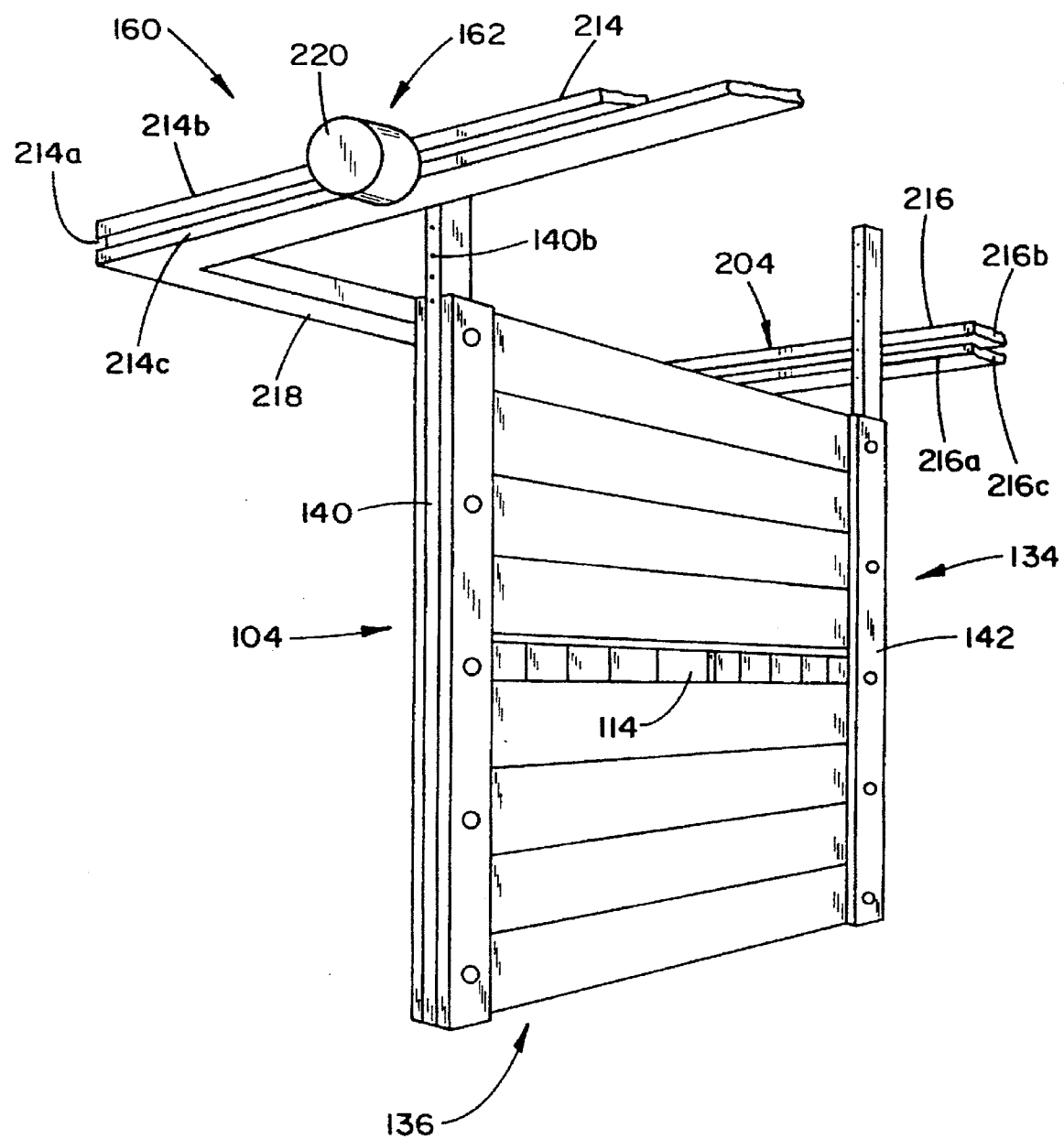
FIG. 9 is a side perspective view illustrating an exposure control assembly of the apparatus of FIGS. 1 and 2.
Figure 13:
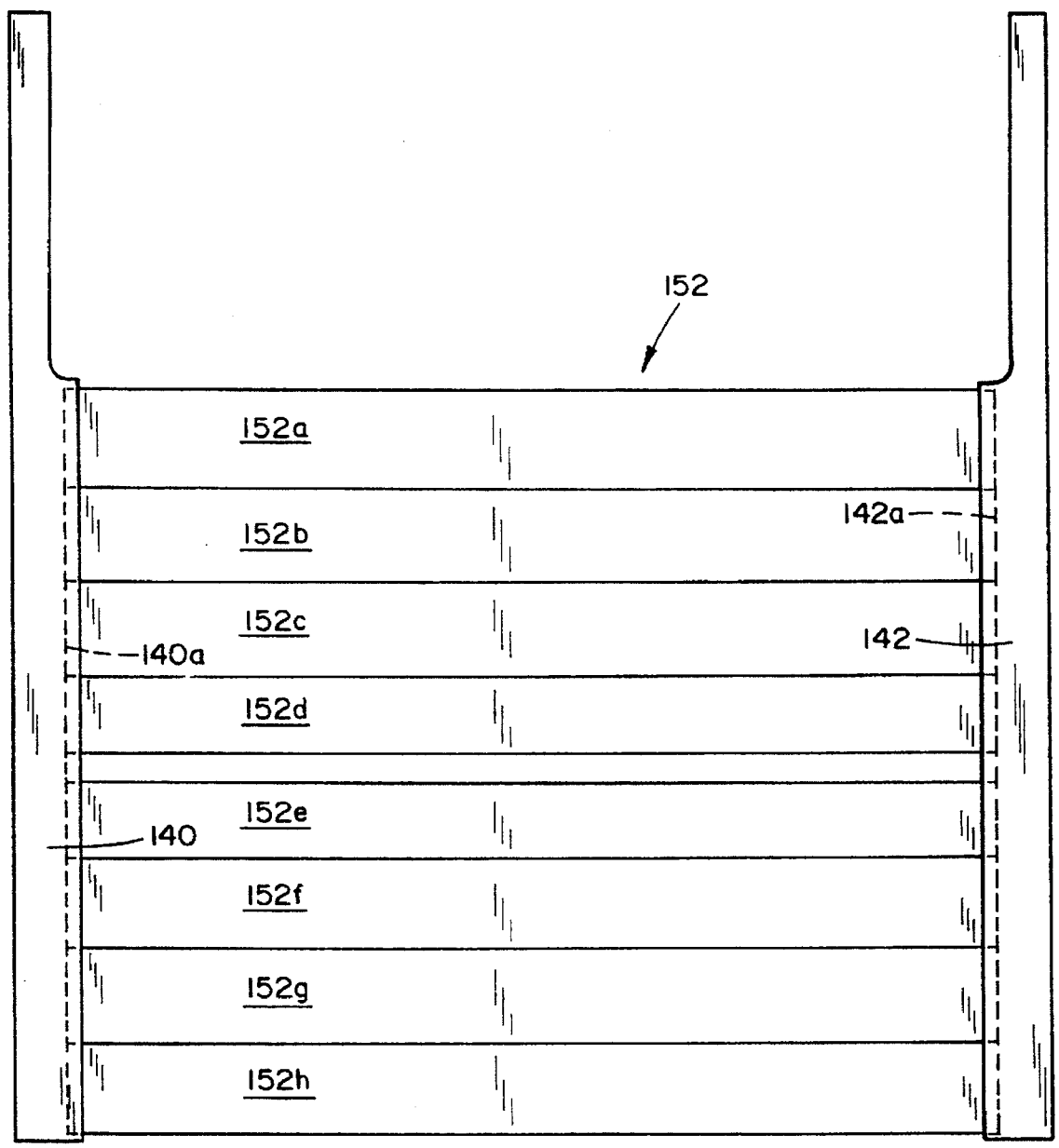
FIG. 13 is a back view of the exposure control assembly.
Figure 17:
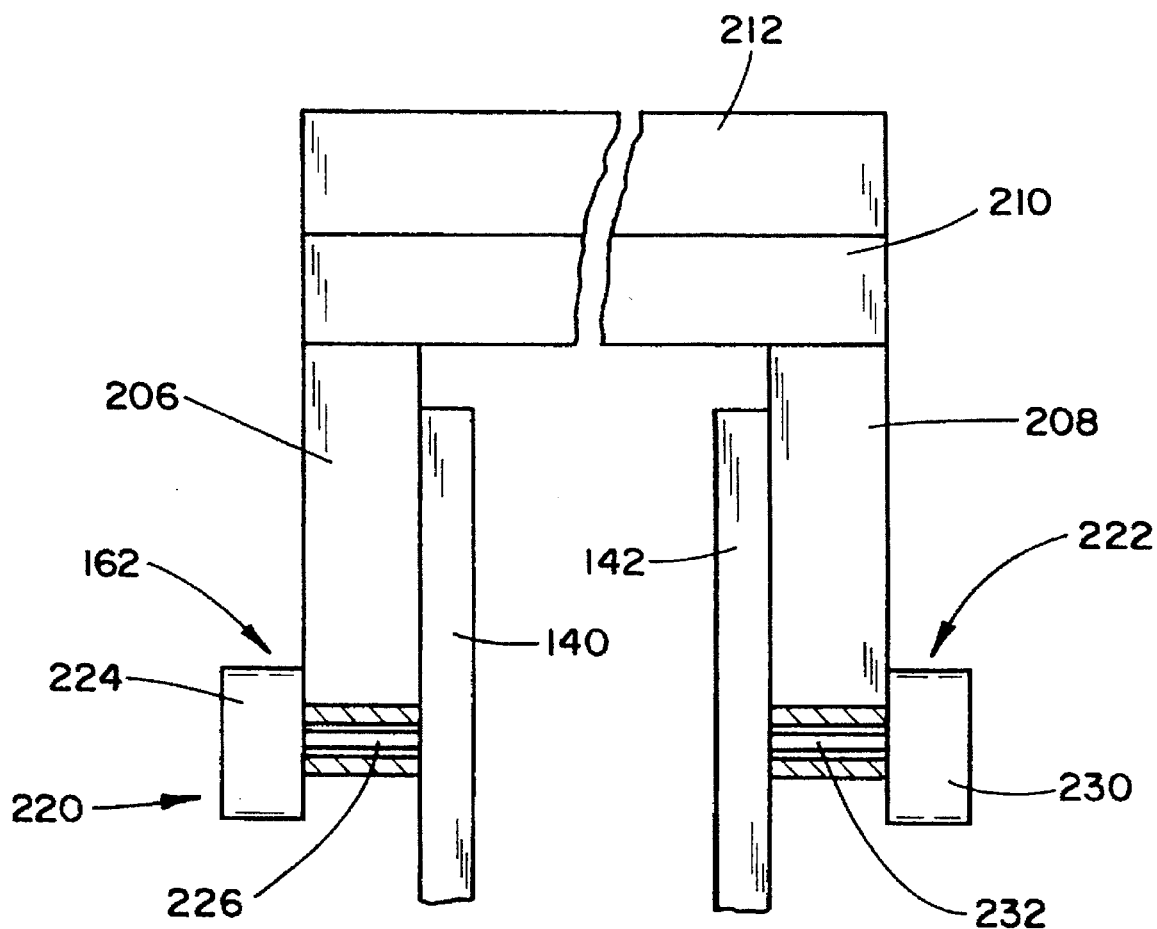
FIG. 17 shows a second coupling means of the apparatus of FIG. 1.

Also, with this embodiment of apparatus 100, support assembly 106 includes support subassembly 154 and a connecting means 156, and support assembly 110 includes support subassembly 160 and connecting means 162. Support subassembly 154 includes support frame 164, support legs 166 and 168, plate 170, and base 172. Frame 164 includes first, second, and third frame legs 174, 176, and 178; and base 172 includes plate 180, and base members 182 and 184. With reference to FIG. 8, connecting means 156 includes a pair of threaded members 186 and 188 and a pair of sleeves 190 and 192. Threaded member 186 includes head 194 and stem 196, and threaded member 188 includes head 198 and stem 202. Support subassembly 160 of assembly 110 includes support frame 204, side plates 206 and 208, and upper support plates 210 and 212; and frame 204 includes first, second and third legs 214, 216, and 218. With reference to FIG. 17, connecting means 162 includes a pair of threaded members 220 and 222. Threaded member 220 includes head 224 and stem 226, and threaded member 222 includes head 230 and stem 232.

As previously mentioned, assembly 102 is provided for holding film, and preferably assembly may hold a plurality of different types of film. With reference to FIGS. 4–6, plate 120 of assembly 102 has a generally flat, rectangular shape, channel members 122, 124, and 126 are mounted on a first, or front, side of plate 120, and bracket members 130 and 132 are mounted on a second, or back, side of the plate. Each of the channel members 122, 124, and 126 has a U-shaped cross section and forms a longitudinally extending channel 122a, 124a, and 126a, respectively. The members 122, 124, and 126 are mounted on plate 120 with the channels 122a, 124a, and 126a facing toward the center of the plate. Preferably, channels 122 and 124 are mounted on plate 120 with the outside edges of the channels extending along and coterminous with the left and right edges 120a and 120b of plate 120, and channel 126 is mounted on the plate with the outside edge of this channel member extending along and coterminous with the bottom edge 120c of the plate. Channel members 122, 124, and 126 are dimensioned and positioned so that a film, of the type referred to as a film pack, can be positioned against plate 120, with the lateral and bottom edges of the film pack extending into and securely held in channels 122a, 124a, and 126a.

Each of the brackets 130 and 132 has a generally rectangular shape, however one longitudinally extending side of each of the brackets is stepped inwardly, forming a shoulder and a recessed surface portion 130a and 132a, respectively. Brackets 130 and 132 are mounted on plate 120 with the stepped sides of the brackets abutting against the plate, and with the shoulders 130a and 132a of the brackets facing toward the center of the plate. Also, preferably brackets 130 and 132 are mounted on plate 120 with longitudinally extending outside edges of the brackets aligned with and coterminous with the left and right edges 120a and 120b of the plate. With this arrangement, plate 120 forms, with each bracket 130 and 132, a respective thin channel 130b and 132b facing toward the center of the plate. Brackets 130 and 132 are dimensioned and positioned so that a film, of the type referred to as a thin film, can be positioned against plate 120, with the lateral edges of the film extending into and securely held in channels 130b and 132b.

Figure 7:
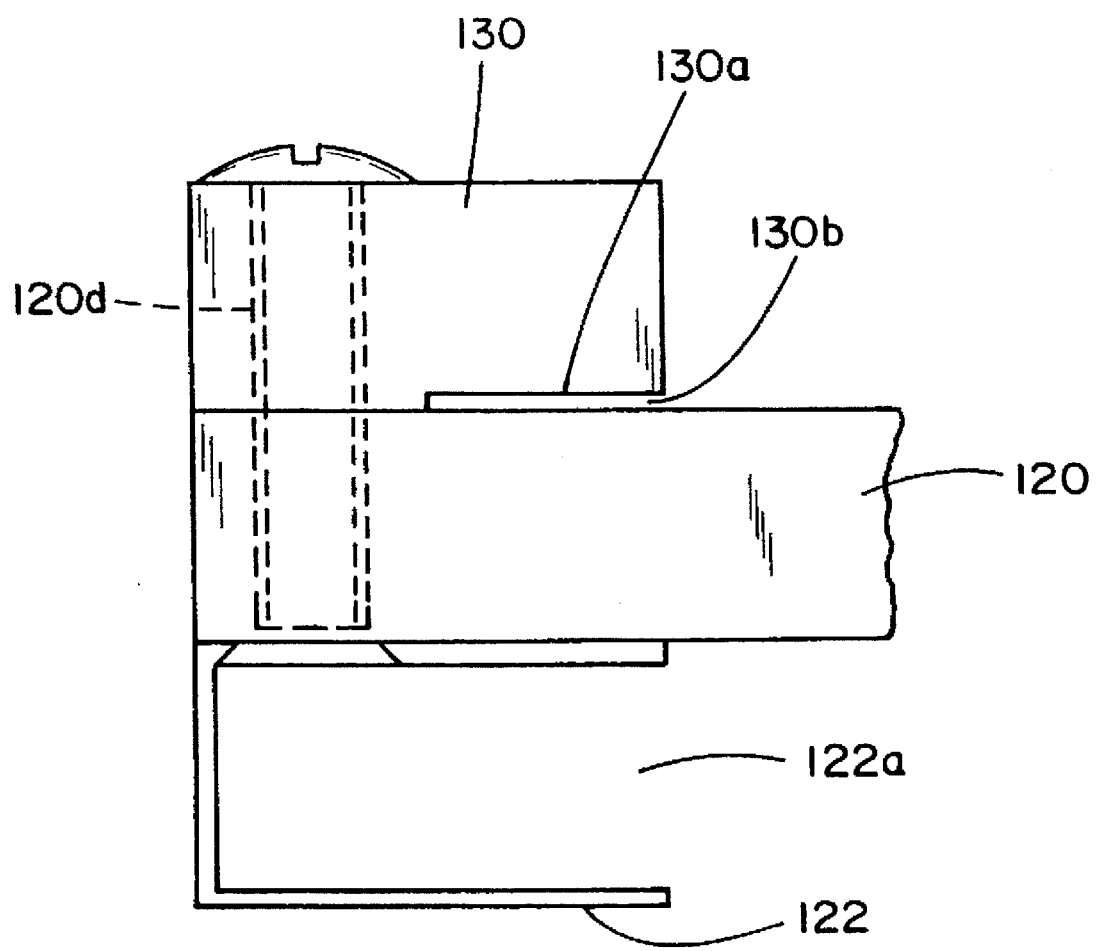
FIG. 7 is an enlarged view of a lower portion of the assembly of FIG. 4, taken along line VII—VII thereof.

Plate 120, channels 122, 124, and 126 and brackets 130 and 132 may be made of any suitable material or materials and may be connected together in any suitable manner. For example, plate 120, channels 122, 124, and 126 and brackets 130 and 132 may be made of aluminum, brackets 130 and 132 may be substantially solid, and channels 122, 124, and 126 may be pressed or stamped into the desired shape. Also, each of channels 122, 124, and 126 and brackets 130 and 132 may be bolted or screwed to plate 120. To facilitate this, plate 120 preferably has an appreciable thickness and is provided with a multitude of threaded openings or sockets along the bottom, left and right edges of the plate. One of these openings is referenced at 120d in FIG. 7.

Assembly 106 is connected to and supports film assembly 102; and preferably, support assembly 106 has a set position and an adjustable position. In the set position, assembly 106 holds film assembly 102 in a generally fixed position relative to support assembly 106; and in the adjustable position, support assembly 106 supports film assembly 102 for at least a plurality of degrees of movement. Preferably, in the adjustable position, support assembly 106 supports film assembly 102 for forward and rearward movement, for pivotal movement about a first, horizontal axis 106a.

With the preferred embodiment of assembly 106 illustrated in the drawings, connecting means 156 connects film assembly 102 to support subassembly 154, and this connecting means has locked and unlocked positions. In the locked position, connecting means 156 holds film assembly 102 in a generally fixed position relative to support subassembly 156; and in the unlocked position, connecting means 156 supports film assembly 102 for forward and rearward movement along support subassembly 154 and for pivotal movement relative to that subassembly.

More specifically, legs 174 and 176 of support subassembly 154 are substantially parallel to each other and are spaced apart, on opposite lateral sides of film assembly 102; and leg 178 of subassembly 154 is connected to and extended between back ends of legs 174 and 176, helping to support those legs and to maintain the legs spaced apart the desired distance. Leg 174 forms a slot 174a that laterally extends completely through the leg and longitudinally extends along a substantial portion of the length of leg 174; and leg 176 forms a similar through slot 176a that laterally extends completely through this leg and that longitudinally extends along a substantial portion of the length of leg 176.

First and second threaded members 186 and 188 of connecting means 156 are supported by legs 174 and 176, respectively, and both of these threaded members engage film assembly 102. When connecting means 156 is in the locked position, threaded members 186 and 188 are in a pressure engagement with legs 172 and 174, respectively, and this pressure engagement holds these threaded members and film assembly 102 in generally fixed positions relative to support subassembly 154. When connecting means 156 is in the unlocked position, threaded members 186 and 188 are supported by legs 174 and 176 for sliding movement along the legs and for pivotal movement.

Threaded members 186 and 188 are substantially identical, and thus only one will be described herein in detail. With particular reference to FIG. 8, threaded member 186 includes head 194 and threaded stem 196. Head 194 has a cylindrical or disk shape, and stem 196 is connected to and extends outward therefrom, generally co-axial therewith. In assembly 110, head 194 of threaded member 182 is laterally located outside of leg 174, and stem 202 of threaded member 182 extends laterally inward, through slot 174a and threadably engages a first side of film assembly 102, specifically threaded opening 120e in the side of plate 120. Analogously, head 198 of threaded member 188 is laterally located outside of leg 176, and stem 202 of threaded member 188 extends laterally inward, through slot 176a and threadably engages a second side of film assembly 102, specifically threaded opening 120f in the side of plate 120. Preferably, a multitude of threaded openings 120e are located on the left side of plate 120, and a multitude of threaded openings 120f are located on the right side of the plate. In this way, the height of assembly 102 can be adjusted by changing the openings 120a and 120b which are used to connect plate 120 to threaded members 186 and 188.

With this arrangement, threaded members 186 and 188 are rotated to move these members between the above-mentioned locked and unlocked positions. In particular, to lock the threaded members 186 and 188—and thereby lock film assembly 102 in a fixed position—the threaded members are rotated to thread these members laterally inward, so that heads 194 and 198 are moved into tight pressure engagement with legs 174 and 176, respectively. To unlock threaded members 186 and 188, those members are rotated so that these members move laterally outward, reducing or eliminating the pressure engagement between heads 194 and 198 and legs 174 and 176.

When threaded members 186 and 188 are in the unlocked position, film assembly 102 may be moved forward or rearward by sliding the threaded members along legs 174 and 176, and more specifically, by sliding stems 196 and 202 along slots 174a and 176a. In addition, when threaded members 186 and 188 are in the unlocked position, film assembly 102 may be pivoted about the axis of stems 196 and 202 by either rotating the threaded members or by pivoting the film assembly about those stems 196 and 202.

Frame 164 of support assembly 106 is itself supported by legs 166 and 168, plate 170, and base 172. More specifically, plate 170 is mounted on and supported by base 172, legs 166 and 168 are connected to and extend upward from plate 170, and frame 164 is connected to and extends outward from legs 166 and 168. Preferably, plate 170 is rotatably mounted on base 172, for rotation about vertical axis 160a; and legs 166 and 168 are rigidly connected to and vertically extend upward from the rearward portion of plate 170. Also, frame 164 is rigidly connected to and horizontally extends forward and rearward of the top ends of legs 166 and 168.

Figure 3:
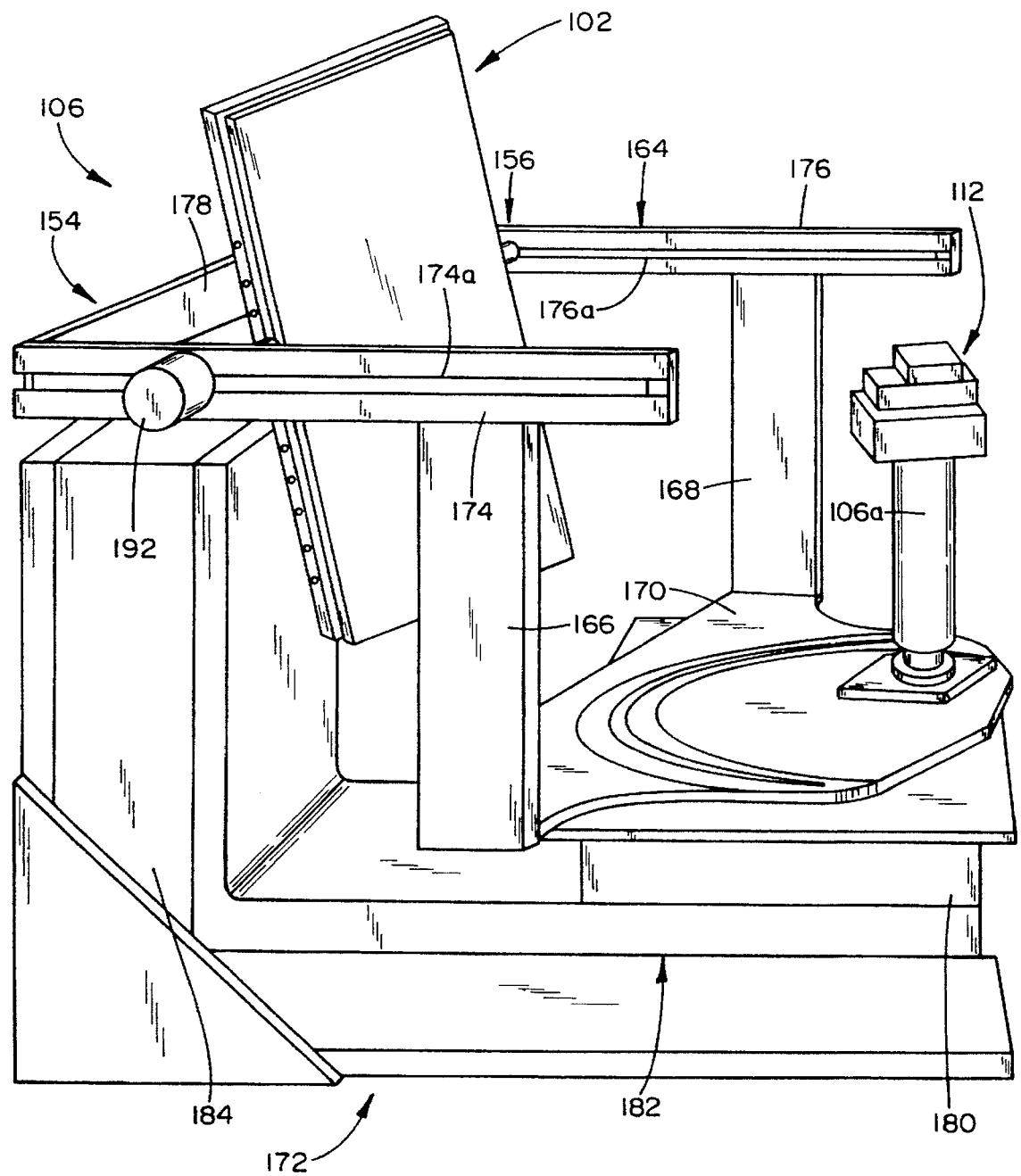
FIG. 3 is a side perspective view showing components of the apparatus of FIGS. 1 and 2.

Base 172 is itself comprised of plate 180 and members 182 and 184. As shown in FIG. 3, members 182 and 184 each have an L-shape, and vertical sections of members 182 and 184 are connected together; and preferably, these members 182 and 184 are connected together so that member 182 may be raised and lowered relative to member 184. Plate 180 is mounted on a forward, horizontal portion of member 182, and plate 170 is mounted, preferably pivotally, on plate 180.

The various components of support assembly 106 may be formed from any appropriate materials, such as aluminum. For example, legs 166 and 168 and plate 170 may be comprised of solid aluminum. Each of legs 174 and 176 may be formed from a respective pair of aluminum bars that are connected together in a spaced apart relationship to form the longitudinal through slots 174a and 176a in the legs. Further, the components of assembly 106 may be connected together in any suitable manner, and for instance, frame 164 may be welded to legs 166 and 168, and these legs may be welded to plate 170.

Exposure area control assembly 104 is located adjacent film assembly 102 and forms adjustable opening 114 to expose a selected area of the film held in the film assembly. Preferably, slats 136 of assembly 104 are supported by frame 134 and form opening 114, and at least a plurality of these slats are moveable, and these slats are moved to move and to adjust the size of opening 114.

With the embodiment of assembly 104 shown in the drawings, first set 150 of the slats are supported by frame 134 and extend in a first direction, preferably vertically across a given area; and second set 152 of slats are also supported by frame 134 and extend in a second direction, preferably horizontally, across that given area. Adjustable opening 114 is formed by at least one of the first set of slats and at least one of the second set of slats, both of which are preferably moveable to move and to adjust the size of the opening 114.

With the specific embodiment of assembly 104 shown in the drawings, first set 150 of the slats includes eight slats, referenced at 150a–150h, and second set 152 of the slats also includes eight slats, referenced at 152a–152h. As will be understood by those of ordinary skill in the art, the sets 150 and 152 of slats may have more or fewer slats than are specifically illustrated in the drawings.

Figure 15:
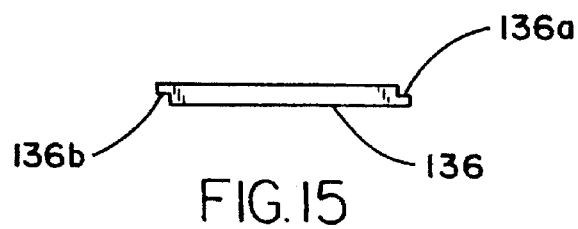
FIG. 15 is a top view of the slat of FIG. 14.
Figure 14:
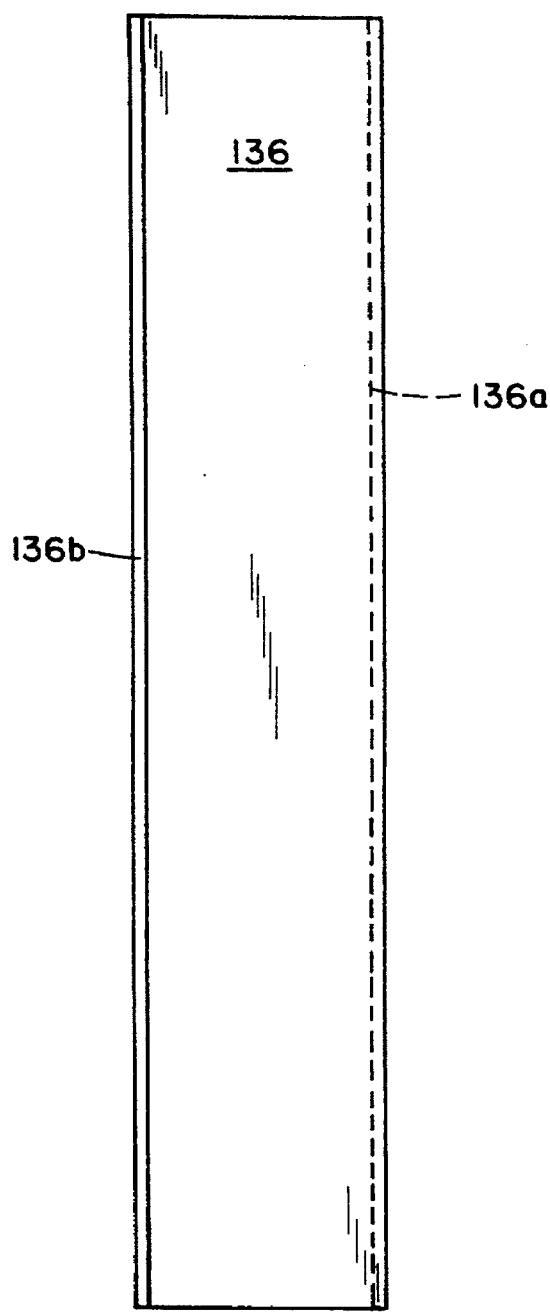
FIG. 14 is a front view of one of the slats used in the exposure control assembly of FIGS. 10–13.
Figure 16:
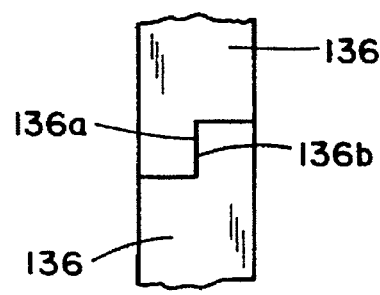
FIG. 16 illustrates portions of two overlapping slats.

Slats 136 are substantially identical to each other. With particular reference to FIGS. 14–16, each slat has a generally rectangular shape, and the left and right edges of each slat are stepped to form front and back shoulder surfaces 136a, 136b, respectively. More particularly as viewed in FIG. 14, the right edge of slat 136 is stepped laterally inwardly, forming a rearwardly facing shoulder surface 136a; and the left edge of the slat is stepped laterally outwardly, forming a forwardly facing shoulder surface 136b. In addition, shoulders 136a and 136b of slats 136 are positioned and dimensioned so that, as particularly shown in FIG. 16, when a pair of these slats are located next to each other and in a common plane, adjacent edges of the slats fit together in an overlapping, abutting relationship.

In assembly 104, vertical slats 150 are located in a common plane inside frame 134, and a pair of these slats 150d and 150e are horizontally spaced apart, forming the vertical edges 114a and 114b of opening 114. Preferably, the slats 150a–150d to the left of opening 114 are contiguous and located side-by-side, completely covering the area inside frame 134 and to the left of opening 114; and, similarly, the slats 150e–150h to the right of opening 114 are contiguous and located side-by-side, completely covering the area inside frame 134 and to the right of opening 114. Also, preferably contiguous slats 150 overlap along their common edges, helping to insure that light or x-rays do not pass between contiguous slats.

Horizontal slats 152 are located in a common plane inside frame 134 and rearward of vertical slats 150, and a pair of these horizontal slats 152d and 152e are vertically spaced apart, forming the horizontal edges 114c and 114d of opening 114. Preferably, the horizontal slats 152a–152d above opening 114 are contiguous and located side-by-side, completely covering the area inside frame 134 and above opening 114; and the horizontal slats 152e–152h below opening 114 are contiguous and located side-by-side, completely covering the area inside frame 134 and below opening 114. As with the vertical slats, preferably contiguous horizontal slats 152 also overlap along their common edges.

Frame 134, as mentioned above, is preferably comprised of frame members 140, 142, 144, and 146. Members 140 and 142 are substantially vertical and parallel to each other, members 144 and 146 are substantially horizontal and parallel to each other, and members 144 and 146 are connected to and extend between members 140 and 142. Preferably, frame members 140 and 142 extend above top frame member 144; and members 140 and 142 are used, as discussed in greater detail below, to connect assembly 104 to assembly 110.

In addition, frame members 140 and 142 define vertically extending grooves 140a and 142a, and frame members 144 and 146 define horizontally extending grooves 144a and 146a. With this preferred embodiment of frame 134, vertical slats 150 extend between horizontal frame members 144 and 146, and these slats extend into and are held in horizontal grooves 144a and 146a; and, likewise, horizontal slats 150 extend between vertical frame members 140 and 142, and these slats extend into and are held in vertical grooves 140a and 142a.

Frame members 140, 142, 144, and 146 and slats 150 and 152 may be made from any appropriate material or materials, such as aluminum. In addition, as will be understood by those of ordinary skill in the art, frame members 140, 142, 144, and 146 may be connected together in any suitable manner, and for example, the frame members may be bolted or screwed together.

Opening 114 can be moved around frame 134 by moving the vertical and horizontal slats 150 and 152. For instance, with particular reference to FIGS. 1 and 10, to move opening 114 to the left, slat 150a can be removed from the left side of frame 134, slats 150b–150h can all be moved to the left within the frame, and then slat 150a can be replaced in the frame, to the right of slat 150h. In addition, to move opening 114 upward, slat 152a may be removed from the top of frame 134, slats 152b–152h may all be moved upward within the frame, and then slat 152a can be replaced in the frame, via the bottom of the frame, below slat 152h. Alternatively, opening 114 may be moved to the right by moving slat 150e to the left so that slat 150e abuts against slat 150d, and slats 150e and 150f are horizontally spaced apart; and to move opening 114 upward, slats 152c and 152d may be moved downward so that slats 152c and 152d abut against slats 152d and 152e, respectively, and slats 152c and 152b are vertically spaced apart. Furthermore, the size and shape of opening 114 can be changed by removing slats from or adding slats to frame 134. For example, the width of opening 114 can be increased by removing the end slat 150h from frame 134 and moving slats 150e, 150f, and 150g to the right, and the height of the opening can be increased by removing top slat 152a from the frame and moving slats 152b, 152c, and 152d upward.

Preferably, slats 150 and 152 are held in place by means of a friction fit between the slats and frame 134. More specifically, vertical slats 150 are held in place by means of friction between those slats and frame members 144 and 146, and horizontal slats 152 are held in place by means of friction between those slats and frame members 140 and 142. In this way, slats 150, 152 can be moved within frame 134, or removed from the frame, by simply pulling or pushing the slats to overcome the friction between the slats and the frame.

Assembly 110 is connected to and supports exposure area control assembly 104, and preferably assembly 110 also has a set position and an adjustable position. In the set position, assembly 110 holds assembly 104 in a generally fixed position relative to support assembly 110; and in the adjustable position, support assembly 110 supports the control assembly 104 for at least a plurality of degrees of movement. Preferably, in this adjustable position, assembly 110 supports assembly 104 for forward and rearward movement, for pivotal movement about a first, horizontal axis 110a and for pivotal movement about a second, vertical axis 110b.

With the preferred embodiment of assembly 110, connecting means 162 connects assembly 104 to support subassembly 160, and connecting means 162 also has locked and unlocked position. In the locked position, connecting means 162 hold assembly 104 in a generally fixed position relative to support subassembly 160; and in the unlocked position, connecting means 162 supports shutter assembly 104 for forward and rearward movement along support subassembly 160 and for pivotal movement relative to this subassembly.

More particularly, legs 214 and 216 of support subassembly 160 are substantially parallel to each other and are spaced apart, on opposite lateral sides of assembly 104; and leg 218 of subassembly 160 is connected to and extends between back ends of legs 214 and 216, helping to support those legs and to maintain the legs spaced apart. Legs 214 and 216 form through slots 214a and 216a that are similar to through slots 174a and 176a of legs 174 and 176. Specifically, through slot 214a longitudinally extends along a substantial portion of the length of leg 214 and laterally extends completely through the leg, and through slot 216a longitudinally extends along a substantial portion of leg 216 and laterally extends completely through that leg.

Connecting means 162 of subassembly 160 is very similar to connecting means 156 of subassembly 154; and in particular, connecting means 162 also includes first and second threaded members 220 and 222 that are supported by legs 214 and 216, respectively, of subassembly 160 and both threaded members 220 and 222 engage assembly 104. When connecting means 162 is in its locked position, threaded members 220 and 222 are in a pressure engagement with legs 214 and 216, respectively, and this pressure engagement holds these threaded members and assembly 104 in generally fixed positions relative to support subassembly 160. When connecting means 162 is in the unlocked position, threaded members 220 and 222 are supported by legs 214 and 216 for pivotal movement and for sliding movement along the legs.

Threaded members 220 and 222 are very similar to threaded members 186 and 188 of assembly 106. With particular reference to FIG. 17, the threaded members 220, 222 includes heads 224, 230 and threaded stems 226, 232. Head 224 of threaded member 220 has a cylindrical or disc shape, and stem 226 is connected to and extends outward therefrom, generally co-axial therewith. Similarly head 230 of threaded member 222 also has a cylindrical or disc shape, and stem 232 is connected to and extends outward therefrom, generally co-axial therewith.

In assembly, head 224 is laterally located outside of leg 214, and stem 226 extends laterally inward from head 224, through slot 214a, and threadably engages a first side of assembly 104, specifically threaded opening 140b of frame member 140. Head 230 of threaded member 222 is laterally located outside of leg 216, and stem 232 extends laterally inward from head 230, through slot 216a and threadably engages a second side of assembly 104, specifically threaded opening 142b of frame member 142. Preferably, a multitude of threaded openings 140b are formed in frame member 140, and a multitude of threaded openings 142b are formed in frame member 142, and the height of assembly 104 can be adjusted by changing the openings 140b and 142b to which threaded members 220 and 222 are connected.

Threaded members 220 and 222 are rotated to move connecting means 162 between its locked and unlocked positions. When threaded members 220 and 222 are in their unlocked positions, assembly 104 may be moved forward or rearward by sliding these threaded members along legs 214 and 216. At the same time, assembly 104 may be pivoted about the axes of stems 226 and 230 by either rotating threaded members 220 and 222 or by pivoting assembly 104 about those stems 226 and 230.

Frame 192 of support assembly 110 is supported by plates 210 and 212. With particular reference to FIG. 1, plates 206 and 208 are connected to and extend upward from legs 214 and 216, and plate 210 is connected to and laterally extends between plates 206 and 208. Plate 210 is connected to and supported by plate 212, which is preferably connected to a support frame or means (not shown). Preferably, each of plates 210 and 212 has a generally rectangular shape, these plates have substantially identical dimensions, and in assembly 110, plate 210 is located directly below plate 212. In addition, preferably plate 210 is pivotally connected to plate 212 for pivotal movement about vertical axis 104a, allowing subassembly 160 and assembly 104 to pivot about that axis. This pivotal connection between plates 210 and 212 may be made in any suitable manner; and, for example, plate 210 may be supported by a bolt that extends through an opening in plate 212 and into threaded engagement with plate 210.

As will be appreciated by those of ordinary skill in the art, the components of support subassembly 160 may be made from any suitable materials and connected together in any appropriate way. For example, legs 214, 216, and 218 and plates 210 and 212 may be made from aluminum; and leg 218 and plates 206 and 208 may be welded or bolted to the back and front ends, respectively, of legs 214 and 216. Also legs 214, 216 may each be made from a respective pair of bars 214b, 214c, and 216b, 216c that are connected together to form grooves 214a and 216a.

Pedestal 112 supporting goniometer 113, on which an article to be photographed or x-rayed may be positioned. Pedestal 112, preferably is capable of six degrees of motion; and more specifically the pedestal 112 can be moved along and pivoted about each of three mutually orthogonal axis, such as the axis designated as x, y and z in FIGS. 1 and 2. Pedestals 112 of this type are well known in the art, and standard, commercially available pedestals may be used in or with apparatus 100.

With reference to FIGS. 1 and 18, in the operation of apparatus 100, a film is placed in assembly 102, and an article 242, such as a crystal wafer, is placed and secured on goniometer 113. Assembly 104 is located immediately forward of assembly 102, with opening 114 of assembly 104 exposing a selected area of the film in assembly 102 and with the rest of that film covered by assembly 104, specifically slats 136 thereof. The film in assembly 102, article 242 on goniometer 113, and opening 114 are positioned such that an x-ray beam 244 from a suitable source (not shown) can be directed onto a portion of the top surface of the article and reflected from that surface portion, through opening 114 and onto the exposed area of the film in assembly 102. An x-ray beam is then so directed onto the article and the film, producing an image of that surface portion of the article on the exposed area of the film.

To produce an x-ray image of a second portion of the top surface of the article, opening 114 is moved to expose a second area of the film; and x-ray beam 244 is directed onto that second surface portion of the article, through opening 114, and onto that second area of the film. Preferably, x-ray beam 244 is moved or swept across the top surface of article 242 in synchronization with movement of opening 114 in order to produce on the film an x-ray image of the entire top surface of the article, or of a selected part of that top surface.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed:

1. Film exposure control apparatus comprising:
   a holding assembly for holding a film;
   a first support assembly connected to and supporting the holding assembly;
   an exposure area control assembly located adjacent the holding assembly and forming an adjustable opening to expose a selected area of the film, the exposure area control assembly including
   i) a frame forming a boundary for a given area, and
   ii) a multitude of slats movably supported by the frame, wherein said slats form the adjustable opening, are movable to move said opening, and substantially completely cover said given area outside of said opening; and
   a second support assembly connected to and supporting the exposure area control assembly.

2. Apparatus according to claim 1, wherein:
   said multitude of slats includes
   i) a first set of slats supported by the frame and extending in a first direction across said given area;
   ii) a second set of slats supported by the frame and extending in a second direction across said given area;
   the adjustable opening is formed by at least one of the first set of slats and at least one of the second set of slats; and
   the at least one of the first set of slats and the at least one of the second set of slats are movable to move the adjustable opening.

3. Apparatus according to claim 2, wherein:
   the first direction is horizontal; and the second direction is vertical.

4. Apparatus according to claim 3, wherein:
   the frame includes
   i) first and second vertically extending side members,
   ii) an upper member connected to and horizontally extending between the side members;
   iii) a lower member connected to and horizontally extending between the side members;
   said given area is bounded by the first and second side members, the upper member and the lower member;
   the first and second side members form vertically extending grooves, and the first set of slats extend into and are held in said vertically extending grooves; and
   the upper and lower frame members form horizontally extending grooves, and the second set of slats extend into and are held in said horizontally extending grooves.

5. Film exposure control apparatus comprising:

a holding assembly for holding a film;

a first support assembly connected to and supporting the holding assembly;

an exposure area control assembly located adjacent the holding assembly and forming an adjustable opening to expose a selected area of the film; and a second support assembly connected to and supporting the exposure area control assembly, wherein the second support assembly has a set position and an adjustable position;

in the set position, the second support assembly holds the exposure area control assembly in a generally fixed position relative to the second support assembly; and in the adjustable position, the second support assembly supports the exposure area control assembly for at least a plurality of degrees of movement.

6. Apparatus according to claim 5, wherein in the adjustable position, the second support assembly supports the exposure area control assembly for forward and rearward movement, for pivotal movement about a first, horizontal axis and for pivotal movement about a second, vertical axis.

7. Film exposure control apparatus comprising:

a holding assembly for holding a film;

a first support assembly connected to and supporting the holding assembly;

an exposure area control assembly located adjacent the holding assembly and forming an adjustable opening to expose a selected area of the film; and a second support assembly connected to and supporting the exposure area control assembly, the second support assembly including (i) a support subassembly, and (ii) means connecting the exposure area control assembly to the support subassembly; and wherein the connecting means has a locked position and an unlocked position;

in the locked position, the connecting means holds the exposure area control assembly in a generally fixed position relative to the support subassembly; and in the unlocked position, the connecting means supports the exposure area control assembly for forward and rearward movement along the support subassembly and for pivotal movement relative to the support subassembly.

8. Apparatus according to claim 7, wherein:

the support subassembly includes first and second legs;

the connecting means includes first and second threaded members;

the first threaded member is supported by the first leg and engages the exposure area control assembly;

the second threaded member is supported by the second leg and engages the exposure area control assembly;

when the connecting means is in the locked position, the first and second threaded members are in a pressure engagement with the first and second legs, respectively, and said pressure engagement holds the first and second threaded members and the exposure area control assembly in generally fixed positions relative to the support subassembly; and when the connecting means is in the unlocked position, the first and second threaded members are supported by the first and second legs for sliding movement there along and for pivotal movement.

9. Apparatus according to claim 8, wherein:

the first leg forms a first longitudinally extending through slot;

the second leg forms a second longitudinally extending through slot;

the first threaded member extends through the first through slot; and the second threaded member extends through the second through slot.

10. Apparatus according to claim 9, wherein:

the first threaded member includes
  i) a head laterally located outside the first leg; and
  ii) a threaded stem connected to the head, extending through the first slot and threadably engaging the exposure area control assembly; and the second threaded member includes
  i) a head laterally located outside the second leg; and
  ii) a threaded stem connected to the head of the second threaded member, extending through the second slot and threadably engaging the exposure area control assembly.

11. Apparatus according to claim 7, wherein:

the exposure area control assembly includes first and second sides;

the connecting means includes
  i) a first threaded member threadably engaging the first side of the exposure area control assembly; and
  ii) a second threaded member threadably engaging the second side of the exposure area control assembly; and each of said sides forms a multitude of threaded openings vertically spread apart along said each side, the openings on the first side being adapted to engage the first threaded member and the openings on the second side being adapted to engage the second threaded members to allow the vertical position of the exposure area control assembly to be adjusted.

12. Film exposure control apparatus comprising:

a holding assembly for holding a film;

a first support assembly connected to and supporting the holding assembly;

an exposure area control assembly located adjacent the holding assembly and forming an adjustable opening to expose a selected area of the film; and a second support assembly connected to and supporting the exposure area control assembly;

wherein the first support assembly has a set position and an adjustable position;

in the set position, the first support assembly holds the holding assembly in a generally fixed position relative to the first support assembly; and in the adjustable position, the first support assembly supports the holding assembly for at least a plurality of degrees of movement.

13. Apparatus according to claim 12, wherein in the adjustable position, the first support assembly supports the film assembly for forward and rearward movement, for pivotal movement about a first, horizontal axis and for pivotal movement about a second, vertical axis.

14. Film exposure control apparatus comprising:

a holding assembly for holding a film;

a first support assembly connected to and supporting the holding assembly;

an exposure area control assembly located adjacent the holding assembly and forming an adjustable opening to expose a selected area of the film; and a second support assembly connected to and supporting the exposure area control assembly;

wherein the first support assembly includes (i) a support subassembly; and (ii) means connecting the film assembly to the support subassembly;

the connecting means has a locked position and an unlocked position;

in the locked position, the connecting means holds the holding assembly in a generally fixed position relative to the support subassembly; and in the unlocked position, the connecting means supports the holding assembly for forward and rearward movement along the support subassembly and for pivotal movement relative to the support subassembly.

15. Apparatus according to claim 14, wherein:

the support subassembly includes first and second legs;

the connecting means includes first and second threaded members;

the first threaded member is supported by the first leg and engages the film assembly;

the second threaded member is supported by the second leg and engages the film assembly;

when the connecting means is in the locked position, the first and second threaded members are in a pressure engagement with the first and second legs, respectively, and said pressure engagement holds the first and second threaded members and the film assembly in generally fixed positions relative to the support subassembly; and when the connecting means is in the unlocked position, the first and second threaded members are supported by the first and second legs for sliding movement there along and for pivotal movement.

16. Apparatus according to claim 15, wherein:

the first leg forms a first longitudinally extending through slot;

the second leg forms a second longitudinally extending through slot;

the first threaded member extends through the first through slot; and the second threaded member extends through the second through slot.

17. Apparatus according to claim 16, wherein:

the first threaded member includes
 i) a head laterally located outside the first leg, and
 ii) a threaded stem connected to the head, extending through the first slot and threadably engaging the film assembly; and the second threaded member includes
 i) a head laterally located outside the second leg, and
 ii) a threaded stem connected to the head of the second threaded member, extending through the second slot and threadably engaging the film assembly.

18. Apparatus according to claim 14, wherein:

the film assembly includes first and second sides, and each of said sides includes a multitude of threaded openings vertically spaced apart along said each side;

the connecting means includes i) a first threaded member threadably engaging one of the threaded openings on the first side of the film assembly, and ii) a second threaded member threadably engaging one of the threaded openings on the second side of the film assembly; and the first threaded member is adapted to engage at least a plurality of the threaded openings on the first side of the film assembly, and the second threaded member is adapted to engage at least a plurality of the threaded openings on the second side of the film assembly, to allow the vertical position of the film assembly to be adjusted.

19. Film exposure control apparatus comprising:

a holding assembly for holding a film, and including a frame having first and second sides, the first side of the frame including means to hold a thin film and the second side of the frame including means to hold a film pack;

a first support assembly connected to and supporting the holding assembly;

an exposure area control assembly located adjacent the holding assembly and forming an adjustable opening to expose a selected area of the film; and a second support assembly connected to and supporting the exposure area control assembly.

20. Film exposure control apparatus comprising:

a holding assembly for holding a film, and including
 i) a plate having first and second sides,
 ii) a set of channel members mounted on the first side of the plate for holding a first film, and
 iii) a set of brackets mounted on the second side of the plate for holding a second film;

a first support assembly connected to and supporting the holding assembly;

an exposure area control assembly located adjacent the holding assembly and forming an adjustable opening to expose a selected area of the film; and a second support assembly connected to and supporting the exposure area control assembly.

21. Apparatus according to claim 20, wherein:

the plate has first and second lateral edges;

the set of channel members includes at least first and second channel members, each of the first and second channel members having a U-shaped cross section;

the first and second channel members are mounted on the plate and extend adjacent the first and second lateral edges thereof, respectively;

the set of brackets includes at least first and second brackets;

the first and second brackets are mounted on the plate and extend adjacent the first and second lateral edges thereof, respectively; and each of the first and second brackets forms a respective channel with said plate for holding the second film.

* * * * *